*Williams & Joseph,*
*Gage Cock.*
*No. 104,090.    Patented June 7, 1870.*
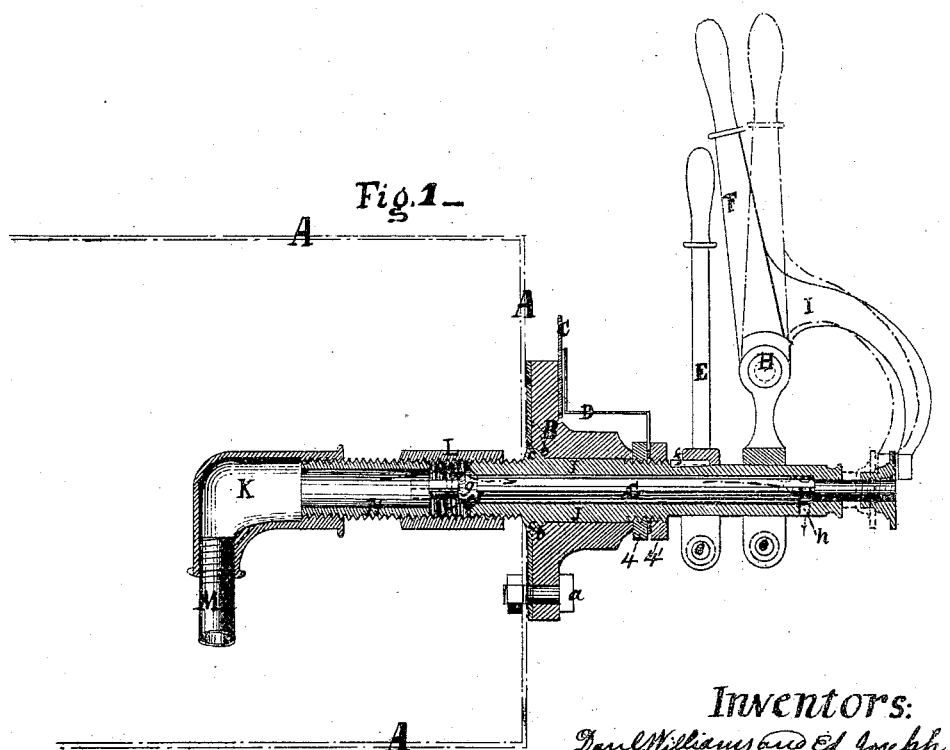
Inventors:
Dan'l Williams and Ed. Joseph
by their Att'ys
J. C. Clayton & Co.
Witnesses:
W. C. Clayton
J. G. Clayton
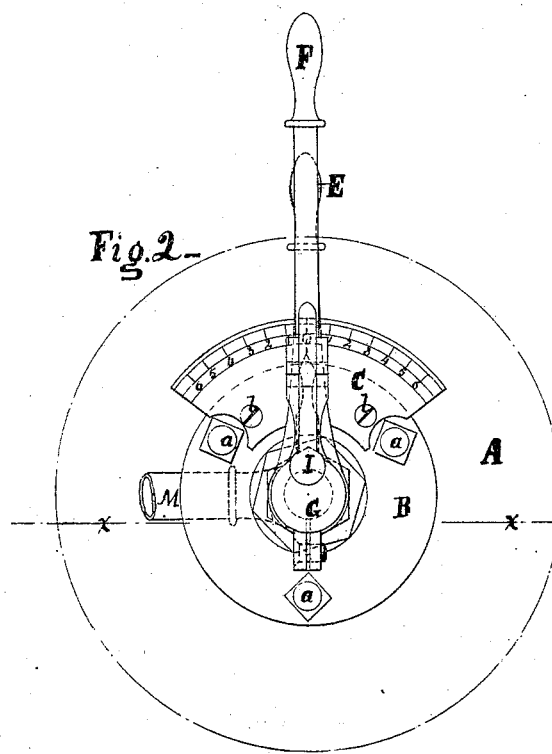
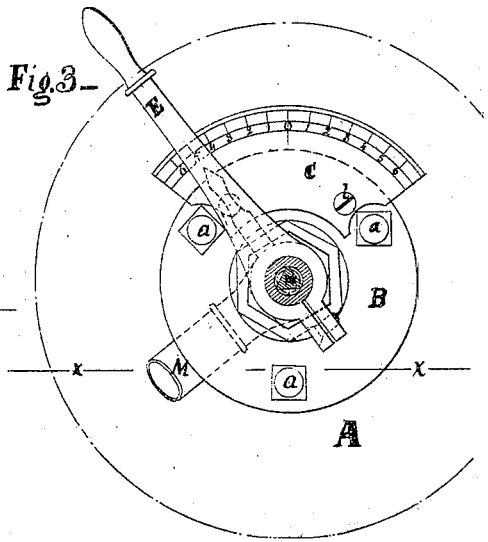

United States Patent Office.

DANIEL WILLIAMS AND EDWARD JOSEPH, OF GALLIPOLIS, OHIO.

Letters Patent No. 104,090, dated June 7, 1870.

REVOLVING STEAM-GAUGE COCK.

The Schedule referred to in these Letters Patent and making part of the same

*To all whom it may concern:*

Be it known that we, DANIEL WILLIAMS and EDWARD JOSEPH, of Gallipolis, in the county of Gallia and in the State of Ohio, have invented certain new and useful "Improvements in Revolving Steam-gauge Cocks;" and we do hereby declare that the following is a full, clear, and exact description thereof, reference being had to the accompanying drawing and to the letters of reference marked thereon.

The nature of our invention consists in making a revolving steam-gauge cock for steam-boilers, to supply with one gauge-cock what is at present done by three cocks placed in different positions in the boiler, our gauge-cock being usually placed in the center of the head of the boiler. The separate parts and arrangement of parts will be hereinafter more fully described.

In the drawing—

Figure 1 is a longitudinal section through the entire cock.

Figure 2 is a front view, representing the invention attached to the boiler-head, the levers and index-pointer in a vertical position, and the revolving pipe or dip in a horizontal position. This is the stationary position of the revolving cock.

Figure 3 is a view of the same parts, showing the index-pointer and levers turned down to figure 5 on the index-plate, and the revolving pipe or dip turned down below the water, so as to designate the quantity of water. The screw-tap is removed and the shape of the valve-rod is seen at *n*.

To enable others skilled in the art to make and use our invention, we will now proceed to describe its construction and operation.

In the construction of our invention we may use any of the materials used for similar purposes.

In fig. 1—

A A A represents the boiler.

B, the plate, which is attached to the head of the boiler by screw-bolts *a*. The inner portion of this plate, through which the stem J passes, is ground, so as to be steam-tight; and on its inner side, seen at *b* *b*, a recess is ground, like a valve-socket or seat, in which a corresponding projection or enlargement, *c c*, of the stem J fits, and, when the stem is inserted, (its projection *c* and the recess *b* having been properly ground to make a steam-tight fit,) the joint between the stem and plate is made and securely held steam-tight, by screwing up the nut 4.

C, the indicator-plate or scale, zero being its vertical point, and is graduated and numbered up to 6, increasing from zero to the right and left, the scale indicating the depth of water in the boiler in feet or inches.

The screw-nuts 4 and 4' fit on the screw cut on the stem J. The inner one, or 4, is to draw the projection *c* snugly up into the valve-seat or recess *b* of the plate. When this is done the indicator or pointer D is then slipped over the stem J and pressed down close to the nut 4. Then the nut 4' is put on over the indicator D, and screwed down tightly, so as to hold the indicator or pointer in place.

E, the lever for operating the cock so as to turn it down or up, as required.

F, the lever for operating the valve G. This lever F has a joint, as seen at H, and a curved arm, I, which rests on or against a screw-tap screwed onto the outer end of the valve-rod G. This valve-rod is made triangular in shape (as shown in fig. 3 by a cross-section) from the valve *g* to a point beyond the hole *h* in the stem J, as seen in fig. 1. Its outer end is made round, and a screw-thread is cut on it, to allow a screw-tap to be fitted to it. This valve-rod G, owing to its triangular shape, fits the pipe or stem J, each corner or point edge bearing against the stem, while the flattened or plane sides of the rod G allow sufficient space within stem J for the escape of steam or water, thus keeping the valve-rod and valve in proper position. Both of the levers E and F fit around the stem J, and are secured tightly around said stem by means of screws *e e*. The lever E is still further tightened to the stem by means of a key, *f*.

The valve end of the valve-rod is seen at *g*, fig. 1, and fits tightly in its seat at the inner end of the stem J, where the stem J is connected to the extension stem N (which has a screw-thread cut on it throughout its entire length) by means of a screw-washer, L, which has a right-and-left female screw-thread. This washer L can be screwed tight against the inner side of the head of the boiler. A curved joint or knuckle, K, is then screwed on the inner end of the stem N, and the revolving tube or dip M is then screwed into the end of the knuckle, the dip being set at right angles to the stem J and lever E.

In fig. 1 the dotted lines show the operation of the lever F and its curved arm I, with valve G, and the arrows show the course of the water and steam in their escape through the stem J, out at the opening or hole *h* in the stem.

In fig. 2 the same letters designate the same parts of the invention as in fig. 1.

*l l* are screws for attaching the indicator-plate or scale to the plate B or the boiler.

In fig. 3 like parts are indicated by same letters as in figs. 1 and 2.

To operate our invention, it will be seen that we place our "revolving steam-gauge cock" in the center of the head of the boiler, with the zero of the scale or indicator-plate on a vertical line passing through the center of said boiler-head. The levers E and F and the pointer or indicator D are also in a vertical position, while the revolving tube or dip M is in a horizontal position, standing just above the water-line $x$, as seen in fig. 2. As soon as steam is generated, the pressure of the same on the valve $g$ presses it on its seat, and effectually prevents the steam's escape.

In order to ascertain the amount of water, and from this the amount of steam in the boiler, the handle-lever E is turned to the left, and, causing the revolving tube or dip M to lower, as shown in fig. 3, lever F is then drawn back or from the boiler-head, turning, with its curved arm I upon the pin or screw-bolt of the joint H, (see fig. 1,) until the arm I is made to press against the screw-tap on the valve-rod G, and the valve $g$ is pushed from its seat, and thereby opening a way of escape from the boiler. The dip-tube M having now reached the water-line $x$, in fig. 3, the water will escape at the hole $h$ in the main stem J, and the amount of water is ascertained by reading the number to which the indicator D points on the scale or indicator-plate; or, if the dip-tube M has not reached the water, steam, instead of water, will escape, and as soon as the lever F, with the curved arm I, is let go, the pressure of the steam will force the valve $g$ to its seat, and the escape of the steam will be cut off.

It will be seen that, by the use of our invention, but one cock is necessary to find the amount of water in the boiler. The principal advantages of our cock are at once obvious. Our invention can be applied to any boiler.

We are aware that a revolving steam-gauge cock having an indicator to designate the depth of water in the boiler is not new; also, that a revolving dip-pipe for the same purpose is not new; also, that levers to operate the same are not new. Therefore, we do not, broadly, claim either.

Having thus fully described our invention,

What we claim as new, and desire to secure by Letters Patent, is—

1. The combination of the stem J, provided with projection $c$, the plate B with its recess $b$, and the nut 4, when constructed and operating substantially in the manner and for the purposes described.

2. The valve-rod G, when constructed and operating substantially in the manner and for the purposes set forth.

3. The combination of the plate B, the stem J, the revolving dip-pipe M, valve-rod G with its valve $g$, indicator D, and levers E and F, constructed and operating substantially in the manner and for the purposes described.

In testimony that we claim the above-described certain new and useful "improvements in revolving steam-gauge cocks," we have hereunto signed our names, this 8th day of April, 1870.

DANIEL $\overset{\text{his}}{\times}$ WILLIAMS.
mark.
EDWARD JOSEPH.

Witnesses:
 JOSEPH HUNT,
 W. H. H. SISSON.